US005687472A

United States Patent [19]

Honma et al.

[11] Patent Number: 5,687,472

[45] Date of Patent: Nov. 18, 1997

[54] METHOD OF MANUFACTURING A VACUUM INTERRUPTER

[75] Inventors: Mitsutaka Honma, Saitama-ken; Hiromichi Somei, Tokyo; Tadahiro Aihara, Tokyo; Tsuneyo Seki, Tokyo; Atsushi Yamamoto, Tokyo, all of Japan

[73] Assignee: Kabushiki Kaisha Toshiba, Kawasaki, Japan

[21] Appl. No.: 433,015

[22] Filed: May 3, 1995

[30] Foreign Application Priority Data

May 12, 1994 [JP] Japan .................................... 6-097790
Apr. 4, 1995 [JP] Japan .................................... 7-078507

[51] Int. Cl.[6] ............................ H01H 11/06; B23K 31/02

[52] U.S. Cl. ..................... 29/622; 228/124.6; 228/180.1; 218/136

[58] Field of Search ........................... 29/622; 228/124.6, 228/180.1; 218/136

[56] References Cited

U.S. PATENT DOCUMENTS 4,933,518 6/1990 Yin .......................................... 218/134

FOREIGN PATENT DOCUMENTS 0 113 208 7/1984 European Pat. Off. .
0 129 080 12/1984 European Pat. Off. .
0 409 047 1/1991 European Pat. Off. .
134 693 3/1979 Germany .
49-6472 1/1974 Japan .
56-28329 7/1981 Japan .
5-290687 11/1993 Japan .
2 182 804 5/1987 United Kingdom .

OTHER PUBLICATIONS

Patent Abstracts of Japan, vol. 15, No. 155 (M-1104), Apr. 18, 1991, JP 03 027871, Feb. 6, 1991.

*Primary Examiner*—P. W. Echols

*Attorney, Agent, or Firm*—Oblon, Spivak, McClelland, Maier & Neustadt, P.C.

[57] ABSTRACT

A method for manufacturing a vacuum interrupter including, a vacuum enclosure composed of an insulating tube sealed by metal flanges, a pair of electrodes in the vacuum enclosure which are able to make and break contact, and a pair of conducting shafts. The method includes the steps of preparing a fixed-side assembly composed of a fixed electrode, a fixed-side conducting shaft and a fixed-side flange jointed as one unit, preparing a movable-side subassembly composed of a movable electrode, a movable-side conducting shaft and a movable-side flange jointed as one unit, preparing an insulating tube subassembly composed of the insulating tube, preparing an assembly such that the movable-side, insulating tube, and fixed-side subassemblies are superimposed with first solders for gas-tight sealing being inserted between the movable-side and fixed-side subassemblies and end surfaces of the insulating tube subassembly and with a second solder for contact soldering being inserted between the contact and the electrode, and heating and evacuating the assembly in a vacuum furnace to evacuate inside the vacuum enclosure and to solder by the first solders and the second solder, thereby to obtain the vacuum interrupter. Whereby gas-tight soldering and soldering of the contact and the electrode are carried out simultaneously in the heating and evacuating step.

14 Claims, 6 Drawing Sheets

METHOD OF MANUFACTURING A VACUUM INTERRUPTER

BACKGROUND OF THE INVENTION

1. Field of the Invention

This invention relates to a vacuum interrupter and a method for manufacturing a vacuum interrupter, and more particularly to a vacuum interrupter and a method for manufacturing a vacuum interrupter wherein the productivity and reliability thereof can be improved.

2. Description of the Related Art

FIG. 10 shows the layout of a conventional vacuum interrupter used in a vacuum circuit-breaker. As is shown in this figure, a vacuum interrupter 10 is provided with a fixed electrode 14 and a movable electrode 15, which are able to make and break contact, inside a vacuum enclosure arranged so that both ends of a ceramic insulating tube 11 are sealed by a fixed-side flange 12 and a movable-side flange 13. A contact 22 is joined to the front surface of fixed electrode 14, the rear surface thereof being secured to the leading end of a fixed conducting shaft 16. Fixed electrode 14 is electrically connected with the outside of the vacuum enclosure by means of this fixed conducting shaft 16. Similarly, a contact 23 is joined to the front surface of the movable electrode 15, the rear surface thereof being secured to the front end of a movable conducting shaft 15. Movable electrode 15 is electrically connected with the outside of the vacuum enclosure by means of this movable conducting shaft 15. Furthermore, movable conducting shaft 17 is attached to movable-side flange 13 via bellows 18, and the making and breaking of the contacts between fixed electrode 14 and movable electrode 15 is enabled by an operating mechanism, which is not depicted, with the vacuum inside the vacuum enclosure maintained. An arc shield 20 is attached inside insulating tube 11, around electrodes 14 and 15. 19 is a bellows cover.

It should be noted that because it uses the outstanding insulating strength found in a vacuum, the vacuum interrupter can have a smaller distance between electrodes and can be smaller in scale than, for example, a SF6 gas circuit-breaker using another insulating medium. Further, the breaking capacity can also be increased by improving the electrode structure.

A material with an outstanding breaking performance and an outstanding anti-welding performance has to be used as the material of the contacts in the vacuum interrupter. For example, pure copper has an outstanding breaking performance, but it has a severe tendency to welding when a large electrical current is passed through, and alloys are therefore generally used. Generally as contact materials, alloys composed of a conductive component: copper (or silver) and an arc-proof material are used to provide enhanced breaking performance and withstand-voltage performance. Typical arc-proof materials include chromium (Cr), tungsten (W) and tungsten carbide (WC), and typical alloys include Cu—Cr alloys, Cu—W alloys and Ag—WC alloys, and recent years have also seen the development of alloys using tantalum (Ta) and the like. Further, as other general contact materials, there are the conductive components i.e. copper and silver including additives which reduce the welding tendency. Typical additives include bismuth (Bi), tellurium (Te), selenium (Se) and antimony (Sb). Typical alloys include Cu—Bi alloys, Cu—Te—Se alloys and the like.

Methods of producing such vacuum interrupters can be broadly divided into the following two types (1) and (2). (1) is a method in which the vacuum interrupter is produced by sub-assembling using soldering or the like in part, and then the vacuum enclosure is formed by welding or the like. The vacuum enclosure is then degassed by evacuating from an evacuation pipe attached to the vacuum enclosure and heating the whole. Then the cooling is carried out with the vacuum in the whole maintained, and the evacuation pipe is press-fitted thereby to produce the vacuum interrupter. (2) is a method known as the vacuum sealing method, in which the vacuum interrupter is produced by sub-assembling using soldering or the like in part, and then stacking the various subassemblies on each other with solder between in a vacuum furnace, placing the whole in a vacuum heating furnace and heating whilst evacuating to degas inside the vacuum enclosure and performing gas-tight soldering. The vacuum sealing method has come into widespread use in recent years for reasons, such as: the lack of any need for an evacuation pipe in the vacuum interrupter, which makes it easy to handle the vacuum interrupter, the ability to manufacture in volume with several tens of units inside the vacuum furnace simultaneously; and the improved reliability since gas-tight soldering can be carried out reliably because it is easy to control the furnace.

In recent years vacuum circuit-breakers employing vacuum interrupters have come into widespread use. They are sometimes used even in large systems. Therefore it has become necessary to increase the breaking capacity and to increase the current-carrying capacity, and volume manufacturing has to be made possible due to increasing demand. In response to such requirements there have been advances in improving the electrode structure and the contact material.

Special alloys, such as Cu—Cr and the like, have been developed as contact materials which improve the breaking performance. Special alloys, such as Cu—Bi and the like, have been developed as contact materials which improve the anti-welding property when breaking large currents.

Meanwhile, as a result of investigations into the relationship between the magnetic field intensity and the arc voltage, in studies of axial magnetic field electrode structures which generate magnetic field parallel to the arc generated between the contacts, it has become clear that the arc voltage exhibits a minimum value at a certain magnetic field intensity. The energy consumed between the contacts can thus be minimized by applying this magnetic field intensity at which the arc voltage exhibits the minimum value, and the breaking capacity can therefore be increased. Such improvements make it possible to increase the breaking capacity. As a method of manufacturing vacuum interrupters, the vacuum sealing method described above makes it possible to achieve volume manufacturing.

When the abovementioned Cu—Cr or other such alloy is used in the contacts, Cr has a larger oxide-formation energy than Cu, so that attention has to be paid to oxidation during manufacturing. In the case of Cu, surface oxides are dissociated at the temperature of soldering (700° C. or above). However, oxides of metal with a large oxide-formation energy, such as Cr, have a stronger tendency to bond with oxygen than to dissociate from oxygen at normal soldering temperatures, so in some cases Cr oxides are formed. Thus sometimes large amounts of Cr oxides remain after the manufacturing process. The thermal energy of the arc generated during current breaking causes this oxygen in Cr oxides to dissociate and become a gas: this impairs breaking performance. When soldering the contact and the electrode during subassembly of vacuum interrupters which employ materials containing such a metal with a large oxide-formation energy, the soldering has to be carried out in a high vacuum or at a high temperature at which dissociation of oxygen occurs, so as not to oxidize the metal. However, when carrying out soldering under a high vacuum, the time taken for the step wherein the high vacuum is maintained is lengthened. In particular, in order to cool under a vacuum after the soldering process, a long time is required with a slow cooling rate. Further, when carrying out soldering at high temperatures, a long time is required to achieve the high temperature. Moreover, because the structural members are put under a high temperature, effects, such as a reduction in the mechanical strength, during high-temperature processing have to be taken into account, with the result that parts with larger size are to be used.

Further, when an alloy, such as the Cu—Bi mentioned above, is used for the contacts, Bi has a lower melting point than Cu, so that consideration has to be given to evaporation during manufacturing. Where Cu is concerned, there are no problems because it does not melt at the temperature (700° C. or above) of soldering. However, metals with a low melting point, such as Bi, melt at normal soldering temperatures. In addition, when carried out soldering in a vacuum, these metals evaporate as metal vapour in the vacuum. So, loss of low melting material of the contacts on subassembly made it necessary to consider ways to ensure satisfactory resistance to welding at the contacts after such loss. Thus, selective evaporation of low-melting-point metals in the contacts may lower the content of such low-melting-point metals after soldering, increasing the tendency for welding. In such cases, countermeasures are taken such as increasing the amount of low-melting-point metals contained in the contacts prior to soldering, and increasing the switching force of the operating mechanism which opens and closes the vacuum interrupter.

With such a method, the material composition of the contacts becomes different between the contact surface and the interior. This therefore led in some cases to changes in the characteristic with current switching. Furthermore, with an alloy containing a large amount of low-melting point material, segregation of the low-melting point material tends to occur. The solder strength decreases when such material is dispersed in the soldered portions during soldering so that it gets into the solder. Countermeasures were required to solve the above-described problems.

SUMMARY OF THE INVENTION

Accordingly, one object of this invention is to provide a vacuum interrupter and a method for manufacturing a vacuum interrupter wherein the productivity of manufacturing the vacuum interrupter can be improved.

Another object of this invention is to provide a vacuum interrupter and a method for manufacturing a vacuum interrupter wherein the breaking performance of the vacuum interrupter can be stabilized.

Still another object of this invention is to provide a vacuum interrupter and a method for manufacturing a vacuum interrupter wherein the number of times that heat treatments are applied to the contacts for manufacturing the vacuum interrupter can be reduced.

Another object of this invention is to provide a vacuum interrupter and a method for manufacturing a vacuum interrupter wherein the oxidation of the contacts and the degradation of anti-welding property can be reduced, thereby the reliability of the vacuum interrupter can be improved.

These and other objects of this invention can be achieved by providing a method for manufacturing a vacuum interrupter including, a vacuum enclosure composed of an insulating tube and a pair of metal flanges including a fixed-side flange and a movable-side flange, both ends of the insulating tube being sealed by the metal flanges, respectively, a pair of electrodes including a fixed electrode and a movable electrode provided in the vacuum enclosure which are able to make and break contact, at least one contact joined to a facing surface of at least one of the electrodes, and a pair of conducting shafts including a fixed-side conducting shaft and a movable-side conducting shaft, each of the conducting shafts being electrically connected at one end thereof to a back surface of one of the pair of electrodes and being outside of the vacuum enclosure at another end thereof for connecting one of the pair of electrodes to the outside, respectively. The method includes the steps of, preparing a fixed-side subassembly composed of the fixed electrode, the fixed-side conducting shaft and a fixed-side flange jointed as one unit, preparing a movable-side subassembly composed of the movable electrode, the movable-side conducting shaft and a movable-side flange jointed as one unit, preparing an insulating tube subassembly composed of at least the insulating tube, preparing an assembly such that the movable-side subassembly, the insulating tube subassembly and the fixed-side subassembly are superimposed with first solders for gas-tight sealing inserted between the movable-side subassembly and one end surface of the insulating tube. subassembly and between another end surface of the insulating tube subassembly and the fixed-side subassembly, and with at least one second solder for contact soldering inserted between the at least one contact and at least one of the electrodes, and heating and evacuating the assembly in a vacuum furnace to evacuate inside the vacuum enclosure and to solder by the first solders and the second solder, thereby to obtain the vacuum interrupter. Whereby gas-tight soldering of the insulating tube and the metal flanges and soldering of the at least one contact and at least one of the electrodes are carried out simultaneously in the heating and evacuating step.

According to one aspect of this invention, there can be provided a method for manufacturing a vacuum interrupter including, a vacuum enclosure composed of an insulating tube and a pair of metal flanges including a fixed-side flange and a movable-side flange, both ends of the insulating tube being sealed by the metal flanges, respectively, a pair of electrodes including a fixed electrode and a movable electrode provided in the vacuum enclosure which are able to make and break contact, at least one contact joined to a facing surface of at least one of the electrodes, and a pair of conducting shafts including a fixed-side conducting shaft and a movable-side conducting shaft, each of the conducting shafts being electrically connected at one end thereof to a back surface of one of the pair of electrodes and being outside of the vacuum enclosure at another end thereof for connecting one of the pair of electrodes to the outside, respectively. The method includes the steps of, preparing a fixed-side subassembly composed of the fixed-side conducting shaft and a fixed-side flange jointed as one unit, preparing a movable-side subassembly composed of the movable-side conducting shaft and a movable-side flange jointed as one unit, preparing an insulating tube subassembly composed of at least the insulating tube, preparing a fixed electrode subassembly composed of at least the fixed electrode, preparing a movable electrode subassembly composed of at least the movable electrode, preparing an assembly such that the movable-side subassembly, the movable electrode subassembly, the insulating tube subassembly, the fixed electrode subassembly and the fixed-side subassembly are superimposed with first solder for gas-tight sealing inserted between the movable-side subassembly and one end surface of the insulating tube subassembly and between another end surface of the insulating tube subassembly and the fixed-side subassembly, and with second solders for electrode soldering inserted between the movable-side subassembly and the movable electrode subassembly and between the fixed electrode subassembly and the fixed-side subassembly, and heating and evacuating the assembly in a vacuum furnace to evacuate inside the vacuum enclosure and to solder by the first solers and the second solders, thereby to obtain the vacuum interrupter. Whereby gas-tight soldering of the insulating tube and the metal flanges and soldering of the electrodes and the conducting shafts are carried out simultaneously in the heating end evacuating step.

According to another aspect of this invention, there can be provided a vacuum interrupter including, a vacuum enclosure composed of an insulating tube end a pair of metal flanges including a fixed-side flange and a movable-side flange, both ends of the insulating tube being sealed by the metal flanges, respectively, a pair of electrodes including a fixed electrode and a movable electrode provided in the vacuum enclosure which are able to make and break contact, at least one contact joined to a facing surface of at least one of the electrodes, and a pair of conducting shafts including a fixed-side conducting shaft and a movable-side conducting shaft, each of the conducting shafts being electrically connected at one end thereof to a back surface of one of the pair of electrodes and being outside of the vacuum enclosure at another end thereof for connecting one of the pair of electrodes to the outside, respectively. One of the electrode and the conducting shaft facing the electrode is provided with a convex portion of a height L1 in the middle of soldering surface thereof, and the other of the electrode and the conducting shaft facing the electrode is provided with a concave portion of a depth L2 in the middle of soldering surface thereof corresponding to the convex portion, and a difference L between the height L1 and the depth L2 is 0.05 to 0.3 mm.

According to still another aspect of this invention, there can be provided a vacuum interrupter including, a vacuum enclosure composed of an insulating tube and a pair of metal flanges including a fixed-side flange and a movable-side flange, both ends of the insulating tube being sealed by the metal flanges, respectively, a pair of electrodes including a fixed electrode and a movable electrode provided in the vacuum enclosure which are able to make and break contact, at least one contact joined to a facing surface of at least one of the electrodes, and a pair of conducting shafts including a fixed-side conducting shaft and a movable-side conducting shaft, each of the conducting shaft being electrically connected at one end thereof to a back surface of one of the pair of electrodes and being outside of the vacuum enclosure at another end thereof for connecting one of the pair of electrodes to the outside, respectively. One of the electrode and the conducting shaft facing the electrode is provided with a first convex portion of a height L1 in the middle of soldering surface thereof, and the other of the electrode and the conducting shaft facing the electrode is provided with a first concave portion of a depth L2 in the middle of soldering surface thereof corresponding to the convex portion, and at least one of the first convex portion and the fist concave portion is provided with a second concave portion of a depth of not less than 0.5 mm with a bottom area of not more than one half of that of the first concave portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
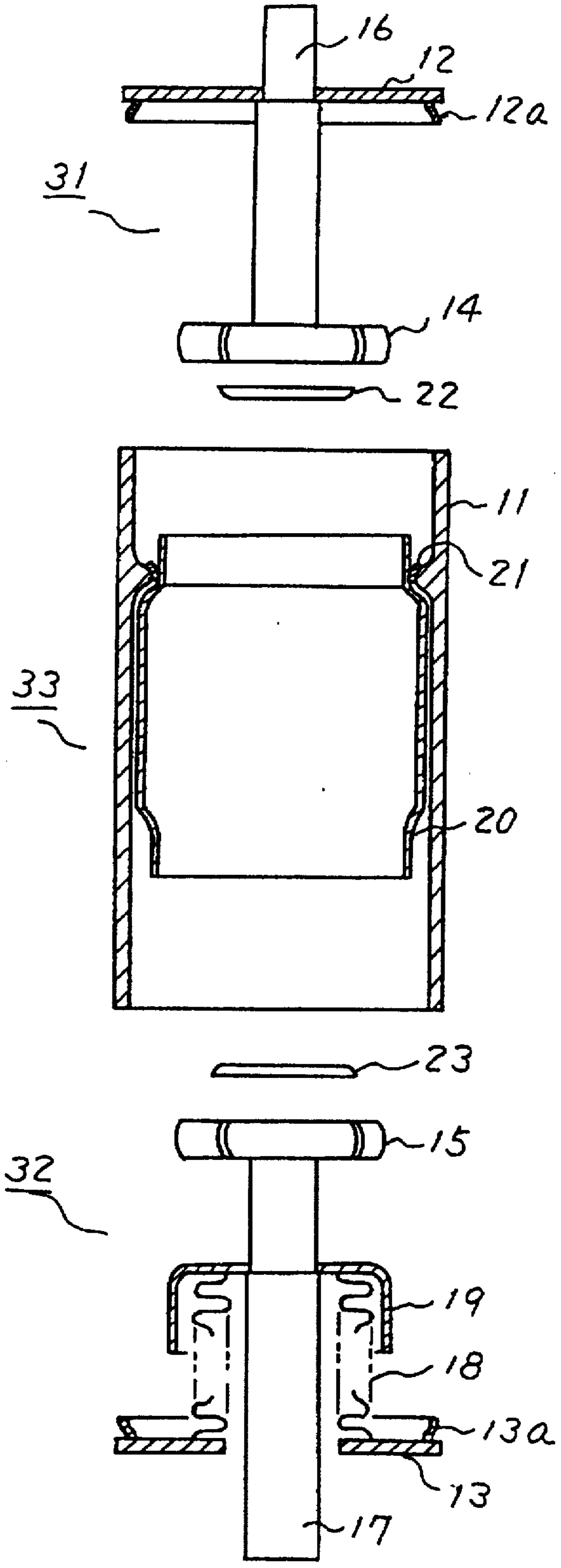
FIG. 1 is a cross-sectional view showing subassembly of a vacuum interrupter according to a first embodiment of this invention.

Referring now to the drawings, wherein like reference numerals designate identical or corresponding parts throughout the several views, the embodiments of this invention will be described below.

FIG. 1 shows a subassembly step of a vacuum interrupter according to a first embodiment of this invention. Since the structure of a vacuum interrupter as a whole is practically the same as that shown in FIG. 10, a description of this is omitted.

In FIG. 1, first of all, a fixed-side subassembly 31 of vacuum interrupter 10 is composed by soldering fixed electrode 14, fixed conducting shaft 18, and fixed-side flange 12. A movable-side subassembly 32 of vacuum interrupter 10 is composed by soldering movable electrode 15, movable conducting shaft 17, bellows cover 19, bellows 18 and movable-side flange 13. An insulating tube subassembly 33 includes arc shield 20 which is mounted on the interior of insulating tube 11 by clamping projection of insulating tube 11 by a support 21 and arc shield 20 and soldering. As for the material of the components that are thus constituted: oxygen-free copper is mainly used for the conducting part; in the case of the flange portions, stainless steel alloy is used; and the joint portion to ceramic insulating tube 11 is made of Fe—Ni alloy or the like. Regarding the solder employed for the subassemblies, solder with a higher melting point than the melting point of a eutectic composition of silver and copper (about 790° C.), for example, Ag (60% by weight) —Cu (40% by weight) alloy with a melting point of about 830° C. is employed. That is, such solder is employed that does not melt at the temperature of the final step in which the gas-tight soldering of the vacuum enclosure is performed, in order to prevent separation of the joints of the subassemblies performed in subassembly steps.

Next, contact 23 is superimposed on electrode 15 of movable-side subassembly 32, with interposition of silver solder for contact soldering. Insulating tube subassembly 33 is superimposed on a seal ring 13a of movable-side subassembly 32 which is provided for joining to insulating tube 11, with interposition of silver solder for soldering. In addition, the assembly produced by superimposing contact 22 on electrode 14 of fixed-side subassembly 31 with interposition of silver solder for contact soldering is superimposed on insulating tube subassembly 33 with interposition of silver solder at a seal ring 12a. As for the material of contacts 22 and 23: conductive constituent is mainly copper or silver; and as the arc-proof material, material is used containing a material, for example chromium, which has a large oxide formation energy than the conductive constitutent. An assembly obtained by assembling the above subassemblies 32, 32 and 33 with interposition of silver solders is then arranged in a vacuum furnace. Assembly of the vacuum interrupter is then completed by heating such assembly to the soldering temperature for example 800°–820° C., after evacuating the vacuum furnace for example $10^{-4}$ Pa. When this heating is performed, gas-tight soldering of the vacuum enclosure is performed by means of the silver solder between insulating tube 11 and seal rings 12a, 13a on the fixed side and the movable side. During this step, soldering between contacts 22 and 23 and corresponding electrodes 14 and 15 is achieved by means of the silver solder between electrodes 14 and 15 and contacts 22 and 23, respectively. In the case of such assembly, a solder composed of the eutectic composition of silver and copper is used for the solder for contact soldering and the solder for gas-tight soldering.

As described above, in this embodiment, gas-tight soldering of the vacuum enclosure and soldering of contacts 22 and 23 containing a metal, such as chromium, which is of larger oxide forming energy than copper as contacts of vacuum interrupter 10, are performed concurrently, so the high temperature treatment is applied to contacts 22 and 23 only once.

In the conventional subassemblies, when soldering the contacts was done in the subassembly step, it was necessary to decrease the extent of oxidation of the contacts on subassembly. Typical methods of doing this were: the method of performing subassembly in high vacuum and carrying out the process in vacuum as far as the cooling step; and the method of carrying out the process at high temperature such that the reducing energy is greater than the oxide formation energy, etc. With such methods, the time required for this step had to be long.

In contrast, with this embodiment, the subassembly step can be performed in a reducing gas atmosphere such as hydrogen gas, or in an inert gas such as nitrogen gas. Since the heat treatment is carried out in gas, the heat distribution within the furnace can he made more uniform, and-since there is good heat conduction, the period of rise of temperature and the period of fall of temperature can be made more rapid. Manufacture of the vacuum interrupter can thereby be facilitated. In addition, since oxidation is decreased, stable and rapid breaking performance can be achieved.

Furthermore, with the conventional method, solderability was lowered due to the formation of an oxide film at the portions of the contacts to be soldered. Consequently, the contacts sometimes became separated from the soldered parts under the impact loading acting during opening and closing.

With this embodiment, oxidation of the contacts can be prevented, so that separation etc. of the contacts cannot occur and reliability can therefore be raised.

Next, a second embodiment of this invention will be described. Regarding the material of the contacts in this embodiment, the major constituent of the conductive constituent is copper or silver. At least one of Bi, Te, Se and Sb, which are of lower melting points than that of this conductive constituent is selected as an additive to lower the tendency to welding: 0.1% by weight or more of such additive is employed in the material of the contacts in this embodiment. Regarding the method of manufacture, just as in the case of the first embodiment described with reference to FIG. 1, fixed-side subassembly 31, movable-side subassembly 32 and insulating tube subassembly 33 are prepared; these subassemblies 31, 32 and 33 are then assembled with contacts 22, 23 with interposition of solders, and the resulting assembly is arranged in a vacuum furnace. Evacuation and heating up to the soldering temperature are then carried out, so that soldering of electrodes 14 and 15 and corresponding contacts 22 and 23, as well as the final gas-tight soldering of the vacuum enclosure, are concurrently executed.

As described above, with this embodiment, soldering of the contacts containing a metal of lower melting point than copper and gas-tight soldering of the vacuum enclosure are performed simultaneously, so the high temperature heat treatment applied to the contacts is performed only once. In the conventional subassemblies, when soldering the contacts was done in the subassembly step, loss of low melting material of the contacts on subassembly made it necessary to consider ways to ensure satisfactory resistance to welding at the contacts after such loss. Typical methods of achieving this are to increase the content of low-melting point material of the contacts.

In contrast, in the present embodiment, since soldering of the contacts is not performed on subassembly, this subassembly process can be performed in a reducing gas atmosphere such as hydrogen, or in an inert gas such as nitrogen, or vacuum, so soldering conditions which are appropriate for the manufacturing installation can be freely selected. Also, subassembly was performed under higher temperature conditions than that of the final gas-tight soldering. With the present embodiment, soldering of the contacts is performed concurrently with the final gas-tight soldering, instead of soldering the contacts in subassembly, so the number of times that heat treatment is applied to the contacts is less than an the conventional method, and the temperature can be made lower. Consequently, the amount of evaporation of low-melting point material contained in the contacts can be reduced, and a vacuum interrupter of high reliability can be obtained.

A third embodiment of this invention will now be described. Some contact materials are of poor solderability. For example, depending on the manufacturing conditions, contacts made of Cu—Cr manufactured by a sintering process may have a lot of pores, leading to poor solderability. Also, if the bismuth content in Cu—Bi alloy exceeds 5% by weight, the bismuth gets mixed into the solder during soldering, lowering the soldering strength. In such cases, subassembly of the contact and electrode is carried out. For electrode subassembly, a method other than soldering, or soldering with a special solder, such as a Ag—Cu—Pd solder etc., is employed. Also, subassembly of the fixed-side subassembly and movable-side subassembly are performed by means of conducting shafts with no electrodes and flanges or other joint, respectively. In the final overall assembly process, soldering of the fixed and movable electrode subassemblies and respective fixed-side and movable-side subassemblies, as well as gas-tight soldering of the seal rings and insulating tube are performed. With such a step, since, in the case of the subassemblies constituted by soldering the electrodes and respective contacts, there are no conducting shaft portions, a large number of these can be contained in the vacuum furnace at the same time, thereby enabling production efficiency to be raised. In some case, it is possible to construct a vacuum interrupter where only one contact is provided which is connected on only one of the fixed side or movable side. In such case, the method of this embodiment may be applied solely in respect of the side where the contact is connected.

The benefit of this embodiment is particularly great in the case where Cu—Cr containing a large quantity of chromium (more than 20% by weight) having larger oxide formation energy than copper, is used as a contact material. Furthermore, if at least one of titanium, vanadium, tantalum and zirconium which are of larger oxide formation energy than chromium, and their compounds is present in the amount of at least 1% by weight in the contact material, by employing the method of this embodiment as described above, oxidation can be eliminated and the time required for the manufacturing process can be shortened.

A fourth embodiment of this invention will now be described. In the case of vacuum interrupters of large rated current, the fixed conducting shaft and movable conducting shaft have to be of large diameter and have large thermal capacity. In the case of such vacuum interrupter, in the step in which the final gas-tight soldering of the vacuum interrupter as described above is performed, the temperature of the soldered portions of the contacts rises later than the temperature of the final gas-tight soldered portions. If therefore conditions are chosen such as to ensure proper soldering of the contact portions, there is a possibility that the gas-tight soldered portions may get overheated. Consequently, for the solder whereby soldering of the contact portions is performed in the final gas-tight soldering process, such solder is employed that is of lower melting point than the solder used for the final gas-tight portions of the vacuum enclosure. For example, Ag—Cu eutectic solder with a melting point of about 790° C. is employed for the final gas-tight soldering, while Ag—Cu—In solder with a melting point of about 720° C. is employed for soldering of the contact portions. By employing such solder, in accordance with the same condition of soldering the final gas-tight soldering portions as that in first embodiment, soldering of the contact portions can be achieved without problems.

Furthermore, after the solders have been inserted between the contacts and the electrodes, caulking may be performed on the electrode parts at the periphery of the contacts, in order to ensure mechanical joining of the electrodes and the contacts, respectively. This mechanical joining is supplementary to the soldering, and is performed in order to prevent positional displacement of the contacts. By such mechanical joining of the contacts and electrodes, positional displacement of the contacts in the final gas-tight soldering step can be prevented, enabling reliability to be improved.

It is also possible to perform this final gas-tight soldering step in a condition in which the pair of contacts are brought into contact. In this way, the reliability of the soldering can be improved by loading the soldering portions of the contacts by applying load from outside the vacuum enclosure in a condition with the contacts placed in contact. After completion of the final gas-tight soldering step, the contacts of the vacuum interrupter are opened, and a step is performed of applying across the contacts a voltage higher than the rated withstand-voltage. The reason for doing this step is that since the contacts would be in the contacting condition in the final gas-tight soldering step, gas physically adsorbed on the contact surfaces might be insufficiently dispelled. Such gas adsorption produces discharge across the contacts when voltage higher than the ordinary voltage is applied across the contacts. Thus, by means of this discharge energy, gas etc. adsorbed on the contact surfaces can be removed, enabling a vacuum interrupter of stable breaking performance to be produced.

Figure 10:
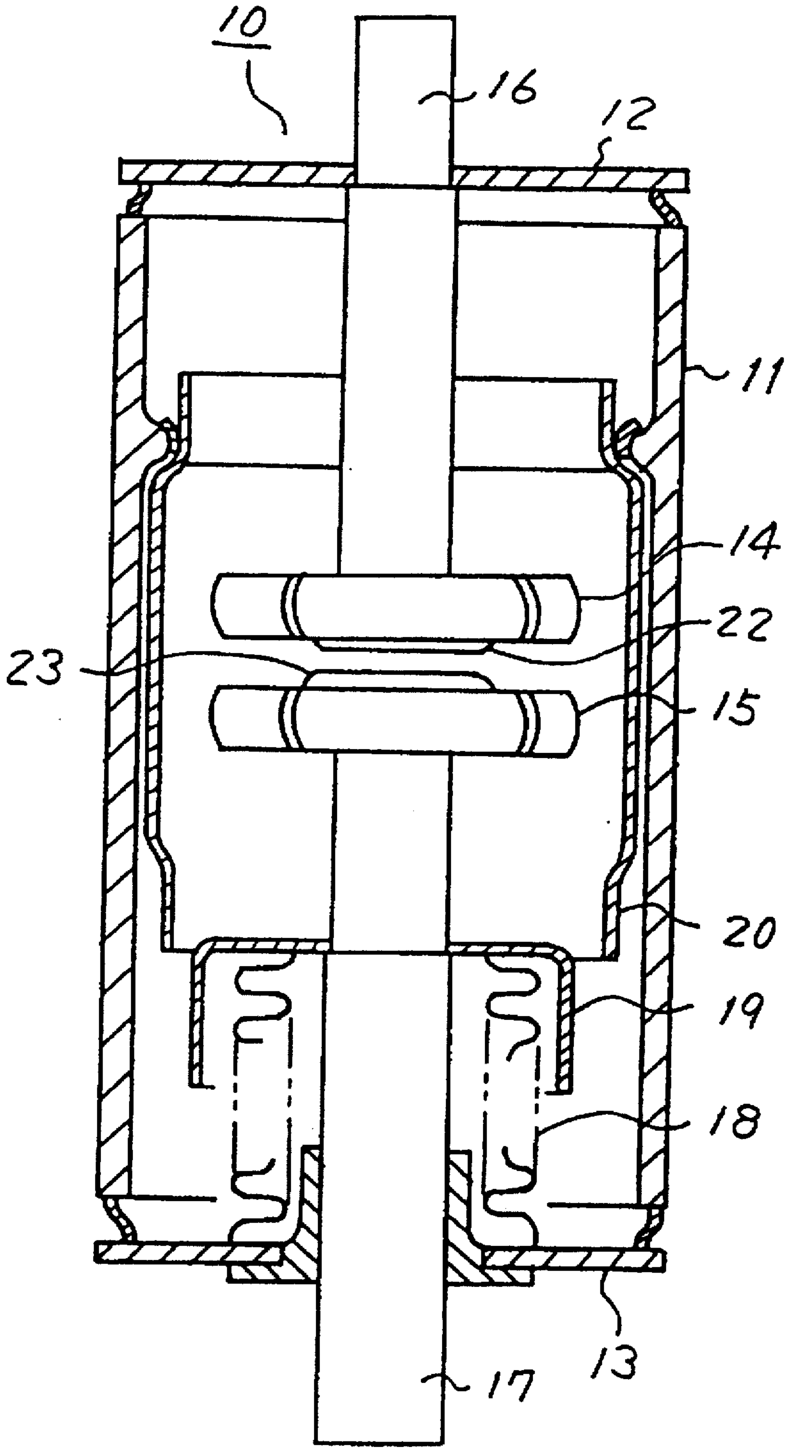
FIG. 10 (PRIOR ART)
FIG. 10 is a cross-sectional view showing the construction of a prior art vacuum interrupter.

A fifth embodiment of this invention will now be described with reference to FIGS. 2–4. The overall construction of the vacuum interrupter is the same as conventionally as shown in FIG. 10 and a description thereof is therefore omitted.

Figure 2:
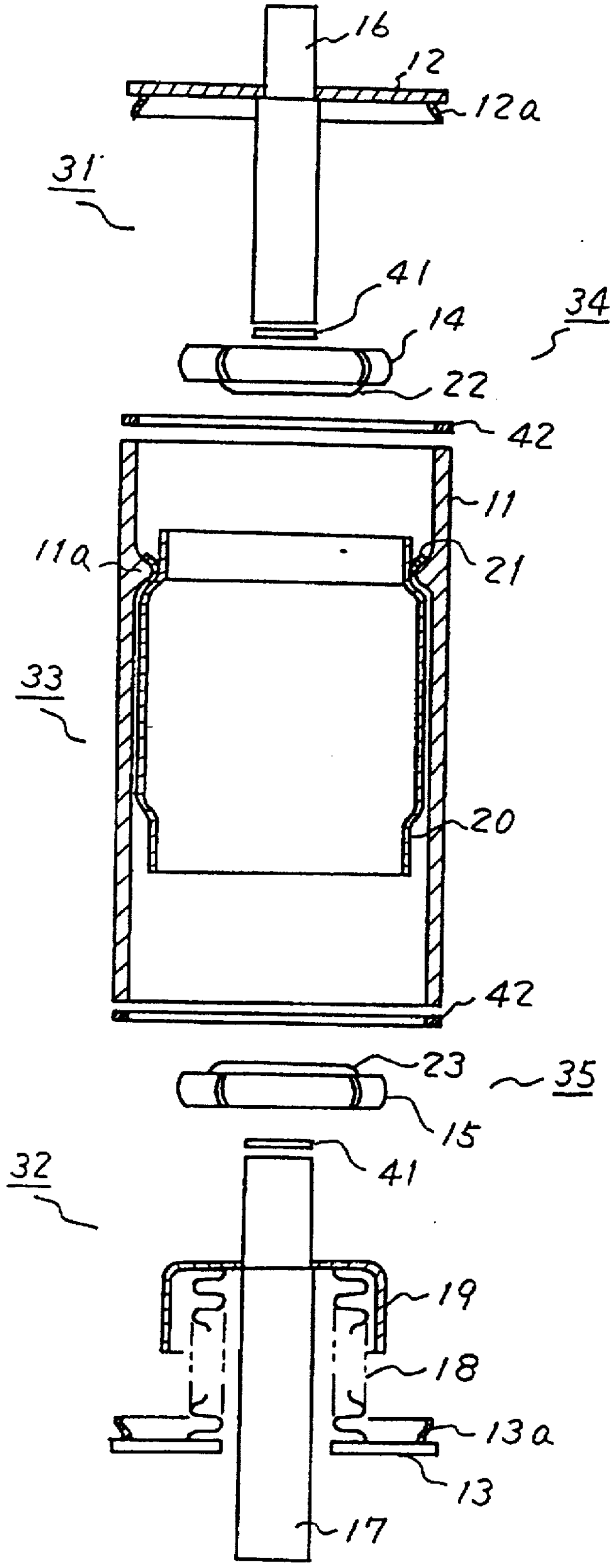
FIG. 2 is a cross-sectional view showing subassembly of a vacuum interrupter according to a fifth embodiment of this invention.

FIG. 2 shows a subassembly step of a vacuum interrupter according to this embodiment. First of all, fixed conducting shaft 16 and fixed flange 12 are soldered for fixed-side subassembly 31 of vacuum interrupter 10. For movable-side subassembly 32 of vacuum interrupter 10, movable conducting shaft 17, bellows cover 19 and bellows 18, and movable-side flange 13 are soldered. For subassembly 33 of the insulating tube, a projection **11*a* of a ceramic insulating tube 11 is clamped by arc shield 20 and support 21 and soldered, so that arc shield 20 is mounted in the interior of insulating tube 11. For electrode subassemblies 34, 35, fixed electrode 14 and contacts 22, movable electrode 15 and contact 23 are respectively soldered. In this case, regarding the material of the constituent components, current passage portions with the exception of contacts 22 and 23 are made of oxygen-free copper. The disk portions of flanges 12 and 13 are made of stainless alloy, and seal rings 12*a* and 13*a* of a tubular shape jointing with ceramic insulating tube 11 are made of Fe—Ni alloy. Also, for the solder employed in subassembly, a solder of higher melting point than the melting point of a eutectic composition of silver and copper (about 790° C.), e.g. Ag (60 wt. %)—Cu (40 wt. %) alloy is used. In the vacuum sealing process, solders composed of such eutectic composition are used. That is, such solder is employed that does not melt at the temperature of the vacuum sealing process (the final step for manufacturing the vacuum enclosure), in order to prevent separation of the joints on vacuum sealing. Electrode subassemblies 34 and 35** are assembled by soldering under vacuum in order to prevent oxidation etc. of the contacts. The other subassemblies are assembled by soldering in hydrogen or inert gas.

Next, movable electrode 15 of movable electrode subassembly 35 is superimposed on movable conducting shaft 17 of movable-side subassembly 32 with interposition of silver solder 41 for soldering movable electrode 15. Insulating tube subassembly 33 is superimposed on seal ring **13*a* of movable subassembly 32 for jointing insulating tube 11, with interposition of silver solder 42** for soldering.

An assembly is produced by superimposing fixed electrode 14 of fixed electrode subassembly 34 on fixed conducting shaft 16 of fixed-side subassembly 31, with interposition of silver solder 41 for soldering fixed electrode 14. The assembly thus produced is superimposed on insulating tube subassembly 33, with interposition of silver solder 42 between seal ring **12*a* and insulating tube Here, fixed conducting shaft 16 and fixed electrode 14 are then joined by press-fitting, with interposition of silver solder 41. The press fitting is performed in order to prevent the electrode falling off in the treatment step when soldering treatment of the entire of vacuum interrupter 10 is performed with the fixed side uppermost. When soldering processing of the entire assembly is to be performed by inverting the fixed side and movable side, press fitting of movable conducting shaft 17 and movable electrode 15** of the movable side which is uppermost is therefore performed as described above. Although, in this embodiment, fixed electrode 14 and contact 22 are joined in assembly step of fixed electrode subassembly 34, they could be assembled by inserting silver solder between contact 22 and fixed electrode 14, instead of performing assembly of fixed electrode subassembly 34. The silver solder that is employed between contact 22 and fixed electrode 14 is composed of the same material as that of silver solder described above, but its shape is altered depending on the size of the soldering face of the contact 22.

Figure 3:
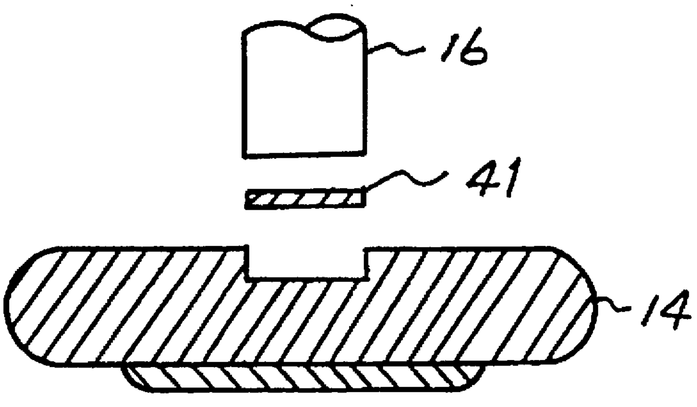
FIG. 3 is a cross-sectional view showing details of the soldering portion of the electrode shown in FIG. 2.
Figure 4:
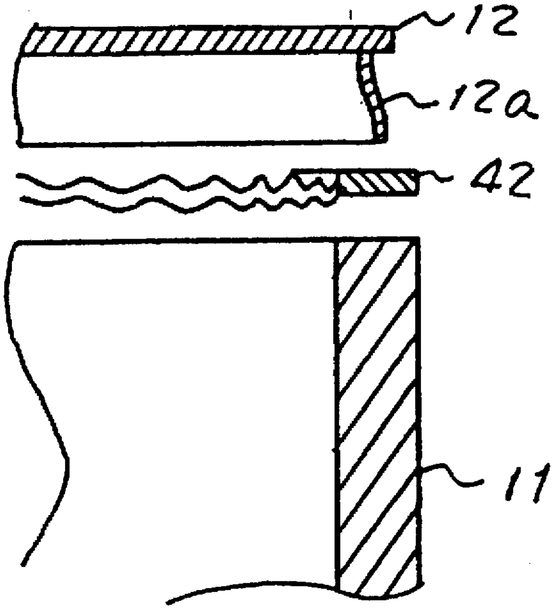
FIG. 4 is a cross-sectional view showing details of the end part of the insulating tube shown in FIG. 2.

FIG. 3 shows a view to a larger scale of the soldering portion of fixed electrode 14 and fixed conducting shaft 16. FIG. 4 shows a view to a larger scale of the soldered portion for gas-tight sealing of the vacuum enclosure. As shown in FIG. 4. Silver solders 42 are inserted between the end portions of insulating tube 11 and fixed side and movable side. Metallizing treatment is carried out on the end face of insulating tube 11. For silver solder 42, a silver solder of a ring shape of the same external and internal diameters as the end face of insulating tube 11 and of thickness 0.3 mm is employed. That is, the amount of silver solder 42 per soldering face of the end surface is specified by a thickness of 0.3 mm. Further, silver solder 42 is of corrugated shape in order to allow evacuation of the interior of vacuum interrupter 10. In contrast, as shown in FIG. 3, for silver solder 41 employed at the soldering portion on the interior of the vacuum enclosure, a silver solder of a disc shape of the same external diameter as conducting shaft to be soldered and of thickness 0.1 mm is employed. That is, the thickness of silver solder 41 per soldering face is specified as 0.1 mm with respect to the soldering face in the vertical direction to the shaft of vacuum interrupter 10.

The assembly of vacuum interrupter by assembling the subassemblies of the various portions described above with insertion of silver solders is arranged in a vacuum furnace. Vacuum interrupter 10 is then produced by performing vacuum evacuation by means of the vacuum furnace, followed by heating to the soldering temperature. On this heating, gas-tight soldering of the vacuum enclosure is achieved by means of the silver solders 42 between fixed and movable seal rings 12*a*, 13*a* and insulating tube 11. In addition, conducting shafts 16, 17 and electrodes 14, 15 are soldered, respectively, by silver solders 41 inserted between conducting shafts 16, 17 and electrodes 14, 15.

As described above, in this embodiment, subassembly of the electrode is effected with the contact of the vacuum interrupter composed of a material including a metal such as chromium of larger oxide formation energy than copper. In this way, with subassembly of only the electrode and contact, the number of components in such subassembly can be made smaller than in the case of various subassemblies of the fixed side and movable side as conventionally, and the volume of the components that are to be vacuum soldered in the case of vacuum soldering can be reduced. By this means, the efficiency of use of the vacuum furnace can be raised, and a high degree of vacuum can be maintained. Also, the time required for the subassembly steps can be shortened, and oxidation can therefore be reduced. As a result, productivity of manufacturing a vacuum interrupter can be raised and a vacuum interrupter of high reliability can be produced.

Also, when subassembly is performed at a temperature at which the reduction energy is higher than the oxide formation energy, it is only the electrode portion that is exposed to this high temperature. There is no possibility of structural components such as the shaft and/or bellows and flange etc. being exposed to high temperature. This makes it possible to perform heat treatment at a higher temperature to a vacuum interrupter of the conventional construction. That is, even when subassembly is performed at high temperature, this step is only performed to the electrodes and contacts. So that the effect of high-temperature heat treatment, such as problems of lowering the strength of the material etc. in the case of stainless steel components etc., can be prevented, and a vacuum interrupter of high reliability obtained.

Also, in cases where subassembly of the contacts is not performed, the number of times that high temperature treatment is applied to the contacts is once only.

Consequently, as the contacts are soldered in the final gas-tight soldering step, manufacture of the vacuum interrupter can be facilitated. Furthermore, since there is little oxidation of the contacts, breaking performance can be improved and stabilized. With the conventional method, generation of oxide on the soldered portions of the contacts lowers the soldering strength. With the embodiment described above, oxidation of the contacts can be prevented, so there is no possibility of a lowering of the soldering strength of the contacts, this enables reliability to be improved.

Next, in this embodiment, the thickness of silver solder 42 used at the end face of insulating tube 11 is set to be 0.3 mm with respect to the metallized face of the end face of insulating tube 11, and the thickness of silver solder 41 used between the electrode and conducting shaft is set to be 0.1 mm. The soldering of the end face of insulating tube 11 provides the final gas-tight soldered portion for maintaining gas-tightness of the vacuum of the interior of the vacuum enclosure. The thermal capacity of the silver solder at each soldered portion can be altered by altering the amount of silver solders of this vacuum gas-tight soldering portion and the interior. That is, since the thermal capacity is proportional to the mass for the same material, by making the amount of silver solder employed in the interior less than the amount of silver solder employed in the gas-tight evacuation portions, its thermal capacity can be made smaller than the thermal capacity of the silver solder employed in the gas-tight evacuation portions. By doing this, on heating, the silver solder in the interior melts first, with the silver solder of the gas-tight soldered portions commencing melting after some delay.

Furthermore, the silver solder contains several tens of ppm of gas. This gas content contained in the silver solder is discharged as gas when the silver solder melts. This discharged gas is discharged inside the vacuum enclosure, and so it must be evacuated to outside the vacuum enclosure. With this embodiment, the melting of the silver solder of the gas-tight portions of the vacuum enclosure occurs later than the melting of the silver solder of the interior, and the holes present at the gas-tight soldering portions of the vacuum enclosure due to the corrugated ring shape of silver solder 42. Thus the discharged gas is evacuated to outside the vacuum enclosure through the holes present at the gas-tight soldering portions of the vacuum enclosure. If the silver solder of the vacuum gas-tight soldered portions were to melt first to provide gas-tight soldering, and then the silver solder in the interior subsequently melted, the gas generated on melting of the silver solder in the interior of the vacuum enclosure would remain there. Such residual gas would have to be evacuated by permeating through all the various components etc or would have to be adsorbed on to a getter provided in the interior of the enclosure, in order to maintain the vacuum of the interior of the vacuum enclosure. With this embodiment, high vacuum of the interior of the enclosure can be achieved, thereby enabling reliability to be raised.

Next, appropriate amounts of silver solders 41 and 42 will be described. As shown in FIG. 4, metallizing treatment is performed on the end face of insulating tube 11. Silver solder 42 has practically the same magnitude of diameters as the portion of this metallizing treatment portion and has a thickness of 0.15 to 0.35 mm. For silver solder 41 that is employed between the electrode and conducting shaft shown in FIG. 3, practically the same size of diameter as the soldered face perpendicular to the central axis of vacuum interrupter 10 is employed. Furthermore, the thickness of silver solder 41 is set to be 0.02 to 0.1 mm. These amounts are obtained by the following reasons. If the thickness at the soldered face of silver solder 41 of the interior of the enclosure is made more than 0.1 mm, voids tend to form in the interior of the soldered portion. The reason for this is as follows. In the conventional subassembly step, a large pressure was applied to the soldered portion by a weight etc provided by a jig. But, according to this embodiment, soldering of the shaft portion in the interior of vacuum interrupter 10 is performed in the final gas-tight soldering step, so that such a large weight cannot be applied. Such results show that a suitable thickness for the silver solder of the interior is 0.02 to 0.1 mm. On the other hand, if the thickness of silver solder 42 at both ends of insulating tube 11 is less than 0.15 mm, the skirt of the soldered portion of each of sealing rings 12*a*, 13*a* is small, adversely affecting mechanical strength. Also, if it is more than 0.35 mm, there is considerable permeation of silver solder 42 from sealing rings 12*a*, 13*a* in the direction of the face of flanges 12, 13. Such results show that the optimum range for the thickness of silver solder 42 at the end of the insulating tube 11 lies in a range 0.15 to 0.3 mm. By keeping the amount of silver solder in the range of this embodiment, defects of the silver solder can be reduced, and reliability can be raised.

Next, a sixth embodiment according to this invention will be described. In the step of performing gas-tight soldering, when the silver solder is cooled after melting, the silver solder of the soldered portions of the interior solidifies more rapidly than the silver solder of the gas-tight soldered portions. Soldering of the shaft etc. of the vacuum interrupter is completed by the solidification of the silver solder of the interior. Further evacuation of the residual gas in the vacuum enclosure can be achieved until the silver solder of the gas-tight soldering portions solidifies. This is because the speed of permeation of gas through the interior of a liquid is faster than the speed of permeation through the interior of a solid.

As a method of delaying solidification of the silver solder of the gas-tight soldering portions, the ceramic constituting insulating tube 11 is heated to the same temperature as that of the metal portions of vacuum interrupter 10. The ceramic has low thermal dispersion, so in the cooling step, its cooling is slower than that of the metal. In this way, it is possible to make the solidification of the silver solder of the gas-tight soldered portions occur later than the solidification of the silver solder of the interior. It is also possible to arrange a large metallic mass, such as a jig, at the gas-tight soldering portion. In this way, by the use of a jig of large mass, the thermal capacity at that portion is made large, with the result that cooling can be slowed down. Almost the same benefit as in the case of the embodiment described above can also be obtained even if solidification of the silver solder is slowed down at only one of the ends of the insulating tube.

With this embodiment, a high-vacuum vacuum interrupter can easily be manufactured, enabling reliability to be improved.

Figure 5:
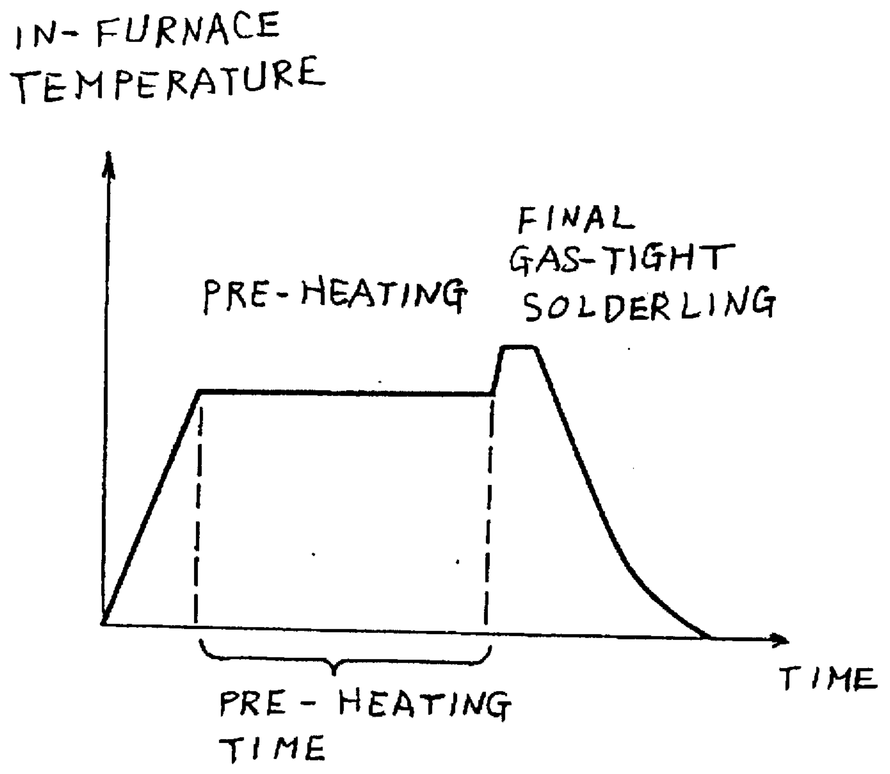
FIG.5 is a view showing soldering conditions of a vacuum interrupter according to a seventh embodiment of this invention.

Next, a seventh embodiment of this invention will be described with reference to FIG. 5. FIG. 5 shows the time-wise change of operating temperature in the final gas-tight soldering step. Before raising the temperature to the final gas-tight temperature conditions, pre-heating is performed in a condition such as to satisfy the relationship $0.02\times T\times M<H<0.2\times T\times M$, where H (minutes) is a pre-heating time, T (°C.) is a furnace temperature of the pre-heating, and M (kg) is a mass of the vacuum interrupter to be soldered. If the pre-heating time is made shorter than that specified by the above expression, during pre-heating the temperatures of the various components in the vacuum interrupter are rising and are partially non-uniform in the final soldering process, insufficient melting portions are therefore generated. In contrast, if soldering is performed at the final soldering temperature for the time till all the silver solders melt, the portions that were first heated up to the melting temperature are held for a long time with the silver solder in a molten condition in the vacuum. When molten metal is held under vacuum, evaporation occurs, so if it is held for a long period, the amount of silver solder is decreased, lowering the strength of the soldering. It is therefore necessary to make the time for which the solder is held at the final soldering temperature short. It is therefore desirable to make all the soldering portions of the vacuum interrupter to be a uniform temperature below the temperature at which silver solder melts. It is for this reason that pre-heating of the above-described conditions is performed.

The heat capacity of the vacuum interrupter is different depending on the mass of the vacuum interrupter. The reason for this can be said to be that the heat capacity of the vacuum interrupter is practically proportional to the mass of the vacuum interrupter, since the conductive shaft portion is constituted of copper, while the insulating enclosure is constituted of ceramic. Consequently, in order to make the temperature of the various portions of the vacuum interrupter uniform during the pre-heating, it is necessary to change the pre-heating time in proportion to the mass of the vacuum interrupter. The following results were obtained in the cases where vacuum interrupters of mass 5 kg and 8.5 kg were soldered after performing pre-heating at 750° C. In the case where the pre-heating time was 120 minutes, in the case of the vacuum interrupter of mass 5 kg, a good soldered condition was obtained. However, in the case of the vacuum interrupter of mass 8.5 kg, the temperature of the conducting shaft portion (in the vicinity of the soldered portion with the electrode) of the vacuum interrupter at the time point of completion of the pre-heating only reached a value of about 700° C., which is lower than the set temperature of 750° C. As a result, a large number of voids were observed in the silver soldered portions of the vacuum interrupter interior. But if the pre-heating time was made 180 minutes, the temperature of the conducting shaft portion of the vacuum interrupter had reached 750° C. by the time point of completion of the pre-heating. As result, excellent condition of the silver soldered portions of the interior of the vacuum interrupter and the silver soldered portions of the ends of the insulating tube was obtained.

Thus, as described above, the temperature at the various portions of the vacuum interrupter can be made uniform by means of the pre-heating time of this embodiment. Further increase of the heating time beyond that specified in the conditions described above, would merely increase the processing time, lowering the efficiency of the operation. With this embodiment, defects in the silver soldered portions can therefore be eliminated, and reliability improved.

Figure 6:
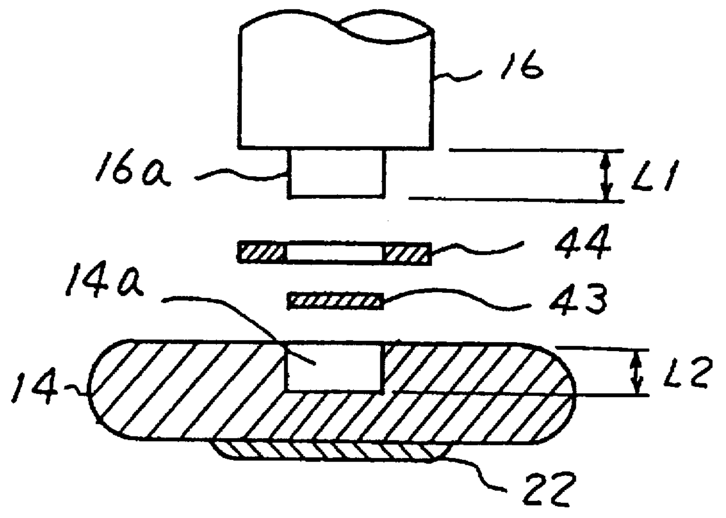
FIG. 6 is a cross-sectional view showing details of a soldering portion of an electrode according to an eighth embodiment of this invention.

An eighth embodiment of this invention will now be described with reference to FIG. 6. FIG. 6 shows a cross-sectional view of electrode 14 and conducting shaft 16. The tip of a conducting shaft 16 is of centrally convex shape, the height of a convex portion 16*a* being L1. Opposing electrode 14 is of centrally concave shape, the depth of a concave portion 14*a* being L2. The difference L of height L1 and depth L2 was chosen to be L=L2–L1=0.1 mm. Silver solder 43 is inserted in the bottom portion of concave portion 4*a*, and silver solder 44 is placed surrounding the periphery of convex portion 16*a*. The thickness of silver solder 43 was chosen to be 0.05 mm, while the thickness of silver solder 44 was chosen to be 0.1 mm.

In some cases, increasing the thickness of silver solder 43 makes the silver solder layer thick and lowers the soldering strength. Furthermore, since the silver solder layer is of a lower electrical conductivity than that of the copper of the conducting shaft, if the silver solder layer is too thick, the resistance between the terminals of the vacuum interrupter is increased, causing increased power loss on conduction. Also, when the silver solder melts and permeates into the peripheral area, the positions of the shaft and electrode are caused to be different, before soldering treatment in which the silver solders are set, and after silver soldering treatment. In the case of subassembly as in the prior art, due to the weight of the jig or the like, even if thick silver solder is employed and permeates into the peripheral area on melting, the thickness of the resultant silver solder layer is less than 0.05 mm, so the silver solder layers of the soldered portions have practically constant dimensions With the present embodiment, since a weight, such as a dig, can not be employed, if silver solder of the conventional thickness were to be used, there would be a risk of occurrence of variability of the dimensions of the soldered portions due to variability of the soldering conditions.

With this embodiment, regarding the thickness of the silver solder layer of the conducting shaft, the portion of the face between the bottom of the recess of the concave portion 14*a* and the tip of the convex portion 16*a* (face perpendicular to the conducting shaft of the vacuum interrupter ) can be made 0.05 mm. Furthermore, the periphery of the projection of the convex portion 16*a* (the face in the axial direction of the vacuum interrupter) can be soldered by permeation of silver solder 44. Thus, by soldering of the tip of the convex portion 16*a* and the periphery, reliability can be raised without lowering the solder strength.

Figure 7:
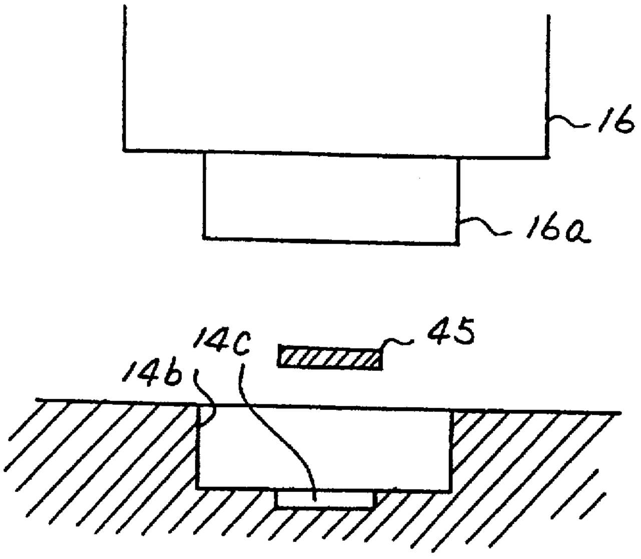
FIG. 7 is a cross-sectional view showing details of a soldering portion of an electrode according to a ninth embodiment of this invention.

Next, a ninth embodiment of this invention will be described with reference to FIGS. 7, 8 and 9. FIG. 7 shows a cross-sectional view of the soldered portion of the electrode and the conducting shaft. In FIG. 7, the tip of conducting shaft 16 has a convex portion 16*a* of a centrally convex shape. In facing electrode 14 a first concave portion 14*b* is provided in the middle of electrode 14, and a second concave portion 14*c* is provided at the middle of first concave portion 14*b*. The depth of second concave portion 14*c* is made more than 0.05 mm, its size is made such that the ratio of the bottom area of second concave portion 14*c* with respect to the bottom area of first concave portion 14*b* is less than ½. Silver solder 45 is arranged in second concave portion 14*c* and soldering is performed. The depth of second concave portion 14*c* is 0.08 mm and silver solder 45 used has a diameter practically the same as that of second concave portion 14*c* and a thickness of 0.1 mm.

With this embodiment, the difference in dimensions before and after melting of the silver solder can be minimized. Furthermore, excellent silver soldering can be achieved in the region peripheral to second concave portion 14*c*, due to permeation of silver solder 45 arranged in second concave portion 14*c*. Furthermore, by keeping the area of second concave portion 14*c* at less than ½ of the area of first concave portion 14*b*, any possibility of deterioration of the conducting performance and properties such as strength can be excluded. Consequently, soldering can be performed easily and well, and reliability can thereby be increased.

Figure 8:
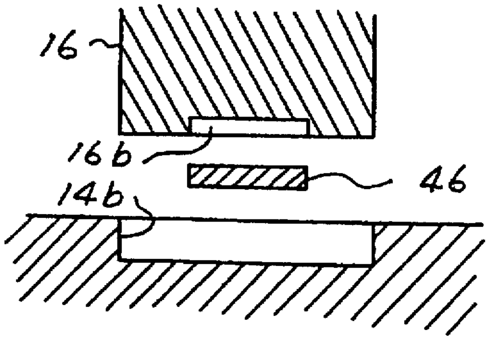
FIG. 8 is a cross-sectional view showing details of another soldering portion of an electrode according to ninth embodiment of this invention.
Figure 9:
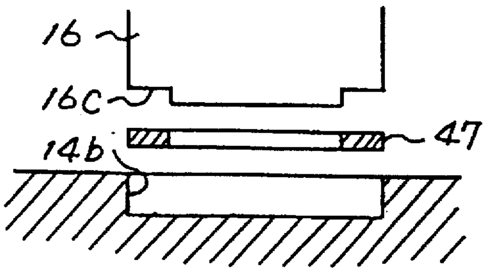
FIG. 9 is a cross-sectional view showing details of still another soldering portion of an electrode according to a ninth embodiment of this invention.

Also, with second concave portion, the same benefits is obtained with the construction shown in FIG. 8 in which a second concave portion 16*b* is provided in the middle of the tip of conducting shaft 16 for inserting silver solder 46 can be obtained.

Moreover, the same benefits can be obtained with a construction as shown in FIG. 8, in which second concave portion 16*c* is formed not at the center but at a peripheral location of conducting shaft 16 for placing a silver solder 47.

Also, by making the relationship between the convex portion and the first concave portion the same as in the case of the eighth embodiment shown in FIG. 6, the same benefits can be achieved even with a construction wherein, apart from the silver solder 45 of FIG. 7, there are provided silver solder 43 and silver solder 44 of FIG. 6.

As described above, according to this invention, it is possible to provide a vacuum interrupter and a method for manufacturing a vacuum interrupter wherein the productivity of manufacturing the vacuum interrupter can be improved.

Furthermore, it is possible to provide a vacuum interrupter and a method for manufacturing a vacuum interrupter wherein the breaking performance of the vacuum interrupter can be stabilized.

According to this invention, it is also possible to provide a vacuum interrupter and a method for manufacturing a vacuum interrupter wherein the number of times that heat treatments are applied to the contacts for manufacturing the vacuum interrupter can be reduced.

It is further possible to provide a vacuum interrupter and a method for manufacturing a vacuum interrupter wherein the oxidation of the contacts and the degradation of anti-welding property can be reduced, thereby the reliability of the vacuum interrupter can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a vacuum interrupter, including, a vacuum enclosure composed of an insulating tube and a pair of metal flanges including a fixed-side flange and a movable-side flange, both ends of said insulating tube being sealed by said metal flanges, respectively, a pair of electrodes including a fixed electrode and a movable electrode provided in said vacuum enclosure which are able to make and break contact, at least one contact joined to a facing surface of at least one of said electrodes, and a pair of conducting shafts including a fixed-side conducting shaft and a movable-side conducting shaft, each of said conducting shafts being electrically connected at one end thereof to a back surface of one of said pair of electrodes and being outside of said vacuum enclosure at another end thereof for connecting one of said pair of electrodes to said outside, respectively, said method comprising the steps of:

preparing a fixed-side subassembly composed of said fixed electrode, said fixed-side conducting shaft and a fixed-side flange jointed as one unit;

preparing a movable-side subassembly composed of said movable electrode, said movable-side conducting shaft and a movable-side flange jointed as one unit;

preparing an insulating tube subassembly composed of at least said insulating tube;

preparing an assembly such that said movable-side subassembly, said insulating tube subassembly and said fixed-side subassembly are superimposed with first solders for gas-tight sealing inserted between said movable-side subassembly and one end surface of said insulating tube subassembly and between another end surface of said insulating tube subassembly and said fixed-side subassembly, and with at least one second solder for contact soldering inserted between said at least one contact and at least one of said electrodes; and heating and evacuating said assembly in a vacuum furnace to evacuate inside said vacuum enclosure and to solder by said first solders and said second solder, thereby to obtain said vacuum interrupter;

whereby gas-tight soldering of said insulating tube and said metal flanges and soldering of said at least one contact and at least one of said electrodes being carried out simultaneously in said heating and evacuating step.

2. A method for manufacturing a vacuum interrupter, including, a vacuum enclosure composed of an insulating tube and a pair of metal flanges including a fixed-side flange and a movable-side flange, both ends of said insulating tube being sealed by said metal flanges, respectively, a pair of electrodes including a fixed electrode and a movable electrode provided in said vacuum enclosure which are able to make and break contact, at least one contact joined to a facing surface of at least one of said electrodes, and a pair of conducting shafts including a fixed-side conducting shaft and a movable-side conducting shaft, each of said conducting shafts being electrically connected at one end thereof to a back surface of one of said pair of electrodes and being outside of said vacuum enclosure at another end thereof for connecting one of said pair of electrodes to said outside, respectively, said method comprising the steps of:

preparing a fixed-side subassembly composed of said fixed-side conducting shaft and a fixed-side flange jointed as one unit;

preparing a movable-side subassembly composed of said movable-side conducting shaft and a movable-side flange jointed as one unit;

preparing an insulating tube subassembly composed of at least said insulating tube;

preparing a fixed electrode subassembly composed of at least said fixed electrode;

preparing a movable electrode subassembly composed of at least said movable electrode;

preparing an assembly such that said movable-side subassembly, said movable electrode subassembly, said insulating tube subassembly, said fixed electrode subassembly and said fixed-side subassembly are superimposed with first solders for gas-tight sealing inserted between said movable-side subassembly and one end surface of said insulating tube subassembly and between another end surface of said insulating tube subassembly and said fixed-side subassembly, and with second solder for electrode soldering inserted between said movable-side subassembly and said movable electrode subassembly and between said fixed electrode subassembly and said fixed-side subassembly; and heating and evacuating said assembly in a vacuum furnace to evacuate inside said vacuum enclosure and to solder by said first solders and said second solders, thereby to obtain said vacuum interrupter;

whereby gas-tight soldering of said insulating tube and said metal flanges and soldering of said electrodes and said conducting shafts being carried out simultaneously in said heating and evacuating step.

3. The method for manufacturing a vacuum interrupter according to claim 1 or claim 2, wherein:

said contact is composed of a conductive component containing mainly copper and/or silver and a material with a larger oxide-formation energy than that of said conductive component.

4. The method for manufacturing a vacuum interrupter according to claim 1 or claim 2, wherein:

said contact is composed of a conductive component containing mainly copper and/or silver and an added component with a lower melting point than that of said second solder.

5. The method for manufacturing a vacuum interrupter according to claim 4, wherein:

said added component includes not less than 0.1% by weight of at least one of bismuth, tellurium, selenium and antimony.

6. The method for manufacturing a vacuum interrupter according to claim 1 or claim 2, wherein:

said second solder includes a second soldering material with a lower melting point than that of a first soldering material for said first solder.

7. The method for manufacturing a vacuum interrupter according to claim 6, wherein:

said first soldering material includes an alloy consisting of a eutectic composition of silver and copper; and said second soldering material includes an alloy containing not less than 5% by weight of indium and said alloy consisting of said eutectic composition of silver and copper.

8. The method for manufacturing a vacuum interrupter according to claim 1 or claim 2, wherein:

in said step of preparing an assembly, said second solders are inserted to a jointing face of said contact, said electrode and said conducting shaft, and then said contact, said electrode and said conducting shaft are joined mechanically.

9. The method for manufacturing a vacuum interrupter according to claim 1 or claim 2, wherein:

an amount of said second solder per sectional area of a jointing face of said contact and said electrode and perpendicular to said conducting shaft is smaller than an amount of said first solder per sectional area of a jointing face of said insulating tube and said metal flange.

10. The method for manufacturing a vacuum interrupter according to claim 9, wherein:

said amount of said first solder is of thickness 0.15 to 0.35 mm and said amount of said second solder is of thickness 0.02 to 0.1 mm.

11. The method for manufacturing a vacuum interrupter according to claim 1 or claim 2, wherein:

in said step of preparing an assembly, said second solder solidifies before said first solder solidifies.

12. The method for manufacturing a vacuum interrupter according to claim 1 or claim 2, wherein:

in said step of preparing an assembly, pre-heating is performed before a final gas-tight soldering;

said pre-heating is performed, firstly by heating said assembly with a temperature rising rate A of 5° C./minute to 20° C./minute up to a pre-heating temperature T (° C.) of 550° C. to 760° C., secondly by heating said assembly at said pre-heating temperature T for a heating time H (minute) determined by a following expression:

$$0.02 \times T \times M < H < 0.2 \times T \times M$$

where M (kg) is a mass of said vacuum interrupter, and thirdly by heating said assembly with a temperature rising rate B larger than said temperature rising rate A up to a gas-tight soldering temperature.

13. The method for manufacturing a vacuum interrupter according to claim 2:

wherein in said vacuum interrupter, one of said electrode and said conducting shaft facing said electrode is provided with a convex portion of a height L1 in the middle of soldering surface thereof, and the other of said electrode and said conducting shaft facing said electrode is provided with a concave portion of a depth L2 in the middle of soldering surface thereof corresponding to said convex portion, and a difference L between said height L1 and said depth L2 is 0.05 to 0.3 mm; and wherein in said step of preparing an assembly, said second solder includes a first silver solder of a thickness t1 of 0.02 to 0.1 mm and a second silver solder of a thickness t2 of a value smaller than (L+t1), and said second solder is inserted such that, in the case that L1>L2, said first silver solder is arranged at tip portion of said convex portion, and said second silver solder is arranged at a portion peripheral to said convex portion, and in the case that L2>L1, said first silver solder is arranged at said portion peripheral to said convex portion, and said second silver solder is arranged at said tip portion of said convex portion.

14. The method of manufacturing a vacuum interrupter according to claim 2:

wherein one of said electrode and said conducting shaft facing said electrode is provided with a first convex portion of a height L1 in the middle of soldering surface thereof, and the other of said electrode and said conducting shaft facing said electrode is provided with a first concave portion of a depth L2 in the middle of soldering surface thereof corresponding to said convex portion, and at least one of said first convex portion and said first concave portion is provided with a second concave portion of a depth of not less than 0.5 mm with a bottom area of not more than one half of that of said first concave portion; and wherein in said step of preparing an assembly, said second solder is inserted an said second concave portion.

* * * * *